United States Patent
Kirkpatrick

(10) Patent No.: US 9,366,302 B1
(45) Date of Patent: Jun. 14, 2016

(54) FRICTION DISKS WITH FLOATING WEAR LININGS

(71) Applicant: Goodrich Corporation, Charlotte, NC (US)

(72) Inventor: Christopher T. Kirkpatrick, Pueblo West, CO (US)

(73) Assignee: Goodrich Corporation, Charlotte, NC (US)

( * ) Notice: Subject to any disclaimer, the term of this patent is extended or adjusted under 35 U.S.C. 154(b) by 27 days.

(21) Appl. No.: 14/610,092

(22) Filed: Jan. 30, 2015

(51) Int. Cl.
| F16D 65/12 | (2006.01) |
| F16D 55/36 | (2006.01) |
| F16D 55/24 | (2006.01) |
| F16D 69/00 | (2006.01) |
| F16D 69/04 | (2006.01) |
| F16D 65/02 | (2006.01) |

(52) U.S. Cl.
CPC .............. F16D 65/12 (2013.01); F16D 55/24 (2013.01); F16D 55/36 (2013.01); *F16D 69/0408* (2013.01); *F16D 2065/1324* (2013.01); *F16D 2069/009* (2013.01)

(58) Field of Classification Search
CPC ......... F16D 55/24; F16D 55/36; F16D 65/12; F16D 65/122; F16D 65/123; F16D 2065/1324; F16D 2065/1364; F16D 2065/1388; F16D 2065/1384; F16D 2069/009; F16D 69/04; F16D 69/0408; F16D 13/40; F16D 13/642; F16D 13/52; F16D 13/68; F16D 2013/642
See application file for complete search history.

(56) References Cited

U.S. PATENT DOCUMENTS

| 5,779,006 | A | * | 7/1998 | Hyde | ...................... F16D 55/40 188/250 D |
| 6,006,885 | A | * | 12/1999 | Borgeaud | ................ F16D 13/52 192/107 M |

* cited by examiner

*Primary Examiner* — Anna Momper
(74) *Attorney, Agent, or Firm* — Snell & Wilmer, L.L.P.

(57) ABSTRACT

Friction disks, such as rotors and stators, including floating wear liners are disclosed. The friction disks may include a core and a floating wear liner configured to contact a contact surface of the core. The cores may include a retention ring that is substantially concentric with the core and extends axially beyond the plane of the contact surface. The retention ring may retain one or more floating wear liners in a substantially concentric position aligned with the contact surface to provide frictional contact with the core during braking.

14 Claims, 8 Drawing Sheets

FRICTION DISKS WITH FLOATING WEAR LININGS

FIELD

The present disclosure relates to aircraft brake systems. In particular, the disclosure relates to a brake disk assembly of an aircraft brake system.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. During high speed landings and rejected takeoffs ("RTOs"), the amount of heat and force generated can be enough to destroy friction disks made of formerly commonly used materials, such as steel. Carbon composite materials are better suited for high temperature use and are now the standard for friction disks in aircraft brake assemblies. However, carbon composite disks can be expensive to manufacture, especially ones having the thickness preferable for use on an aircraft. Replaceable wear liners bonded to a reusable core may delaminate from the core due to the high shear force during braking in combination with high braking temperatures.

SUMMARY

In various embodiments, an aircraft brake system may comprise a plurality of friction disks. A friction disk may comprise a friction disk core and a floating wear liner. A friction disk core may comprise a contact surface that defines a contact surface plane. A friction disk core may also comprise a retention ring extending axially relative to the contact surface plane. The retention ring may include an angled retention ring wall that provides a centration surface. The floating wear liner may be in rotatable contact with the friction disk core. The retention ring may radially constrain a floating wear liner in position that is substantially concentric with the friction disk core.

In various embodiments, a multi-disk brake system is disclosed. A multi-disk brake system may comprise a plurality of adjacent stator-rotor pairs. Each of the plurality of adjacent stator-rotor pairs may comprise a stator with a stator core and a rotor with a rotor core. A plurality of floating wear liners may be disposed between the stator core and the rotor core in at least one of the plurality of adjacent stator-rotor pairs. At least one of the stator cores and the rotor cores may comprise a retention ring. The floating wear liners may be radially constrained within the multi-disk brake system by the retention ring located on at least one of the stator cores or rotor cores. A retention ring may be configured to radially constrain two or more floating wear liners. A floating wear liner may be able to move axially and rotationally with respect to the stator core or the rotor core comprising the retention ring constraining the floating wear liner and/or with respect to a second floating wear liner. A stator core may comprise a rotor retention ring slot configured to receive a rotor retention ring, and a rotor core may comprise a stator retention ring slot configured to receive a stator retention ring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Friction disks, including rotors, stators, and floating wear liners, are disclosed. The friction disks may include a friction disk core with a contact surface and a floating wear liner configured to contact the contact surface. The core may comprise a retention ring concentric with the core and extending axially relative to a contact surface plane. The retention ring may radially constrain the floating wear liner in a multi-disk brake system in a position substantially concentric with a friction disk core suitable to provide frictional contact with the core and/or an adjacent friction disk during braking.

Figure 1:
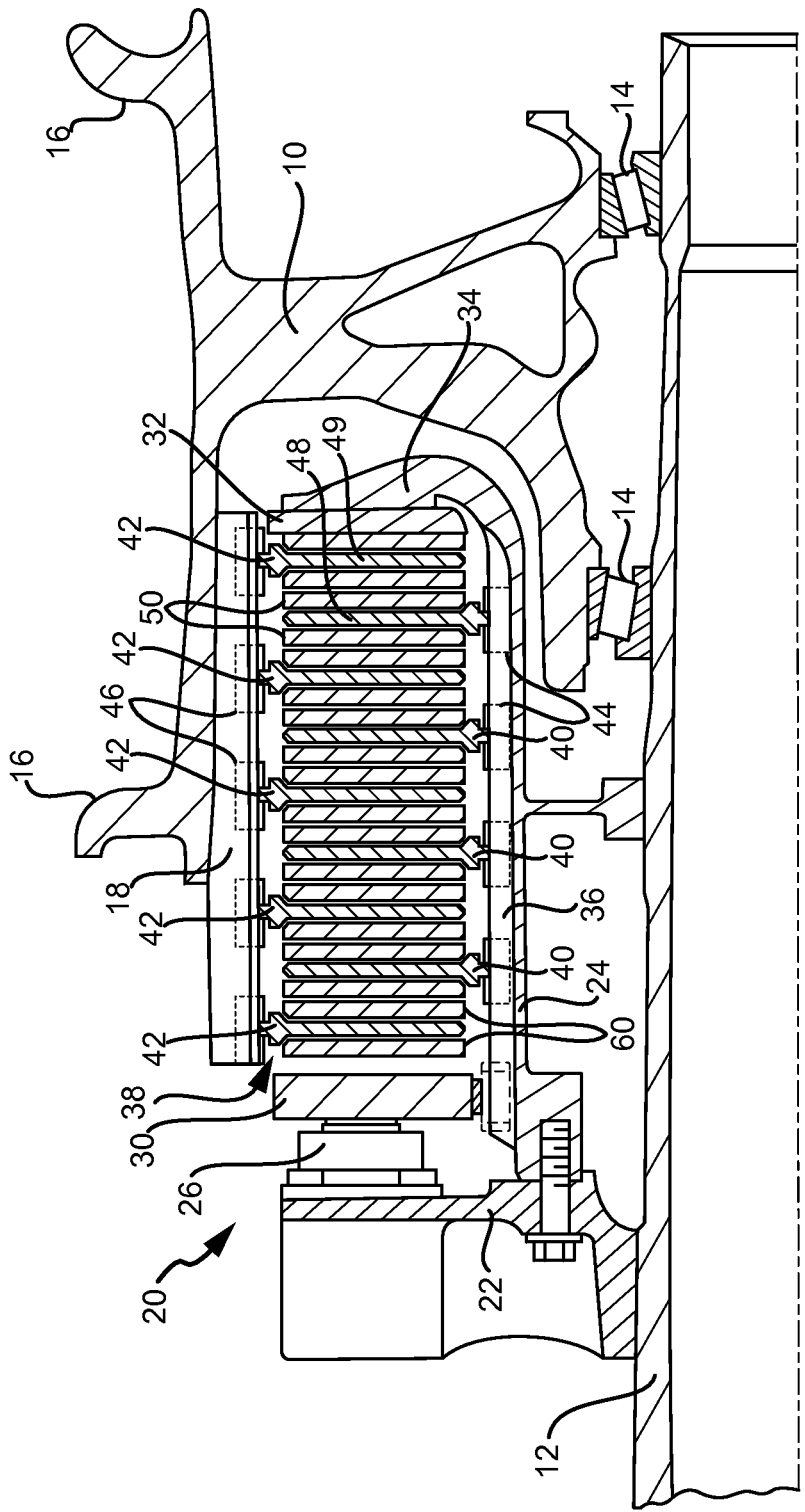
FIG. 1 illustrates, in accordance with various embodiments, a multi-disk brake system.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire (not shown), and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 is an elongated annular structure that includes reaction plate 34 and a series of axially extending stator splines 36 (one shown). Reaction plate 34 and stator splines 36 may be integral with torque tube 24 as shown in FIG. 1, or attached as separate components.

Multi-disk brake system 20 also includes a plurality of friction disks 38. Each friction disk 38 may comprise a friction disk core. The plurality of friction disks 38 includes at least one friction disk 40 with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and floating stator wear liners 50. Rotors 42 may comprise a rotor core 49 and floating rotor wear liners 60. Each friction disk 38 includes an attachment structure. In the embodiment of FIG. 1, each of four stators 40 includes a plurality of stator lugs 44 at circumferentially spaced positions around stator 40 as an attachment structure. Similarly, each of five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 is mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42 with rotor cores 49. Pistons 26 may be powered electrically, hydraulically, or pneumatically.

Figure 2:
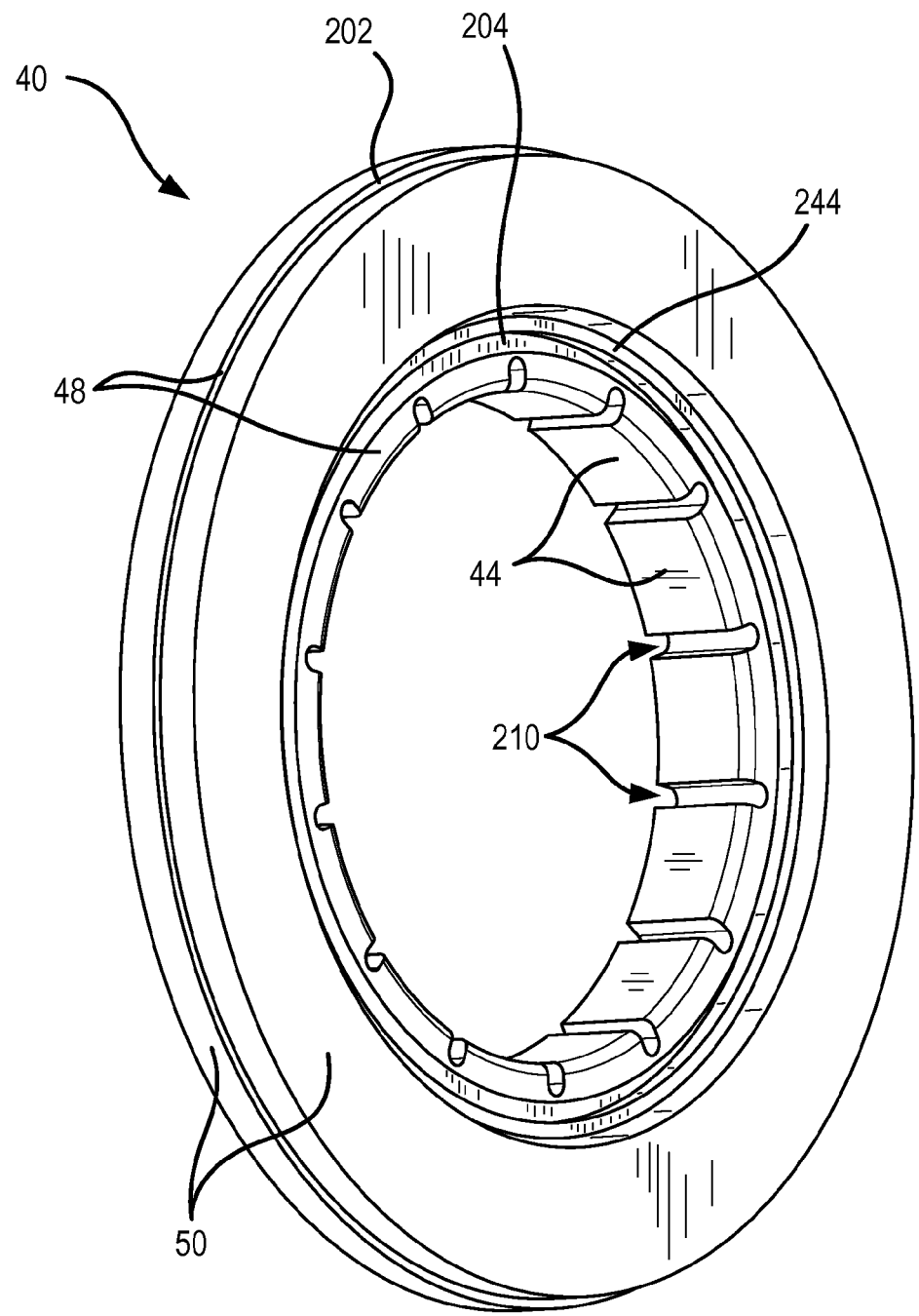
FIG. 2 illustrates, in accordance with various embodiments, a perspective view of a stator having a floating wear liner.

Referring to FIG. 2, a stator 40 is illustrated according to various embodiments. Stator 40 may comprise a stator core 48 and floating stator wear liners 50. Stator core 48 and floating stator wear liners 50 may comprise different materials. For example, in various embodiments, stator core 48 may comprise a first material such as steel, and floating stator wear liners 50 may comprise a second material such as a carbon composite material. However, in various embodiments, stator core 48 and stator wear liners 50 may comprise the same material, such as a carbon composite material. In various embodiments, the material of stator core 48 may be selected for its structural properties, thermal conductivity, heat capacity, and/or oxidation resistance properties. For example, stator core 48 may comprise silicon carbide or titanium. In various embodiments, a material of floating stator wear liners 50 may be selected for its wear resistance and/or frictional properties. Thus, stator 40 may contain the structural advantages of stator core 48 and the frictional advantages of floating stator wear liners 50.

Stator core 48 may comprise spine 202 and inner core 204. Inner core 204 may comprise stator lugs 44. Inner core 204 may further comprise stator gaps 210 between an inner portion of stator lugs 44. Stator gaps 210 may be located to align with stator splines 36. The engagement between the stator splines 36 and stator lugs 44 prevents stator core 48 from rotating in response to a torque being applied to stator 40 during braking. Stator core 48 may further comprise stator retention ring 244 located at a radially outer portion of inner core 204. Stator retention ring 244 may comprise an annular feature extending axially from the stator core 48 relative to a contact surface plane of the stator core, as described in greater detail below. In various embodiments, stator retention ring 244 may be substantially concentric with stator core 48.

Figure 3:
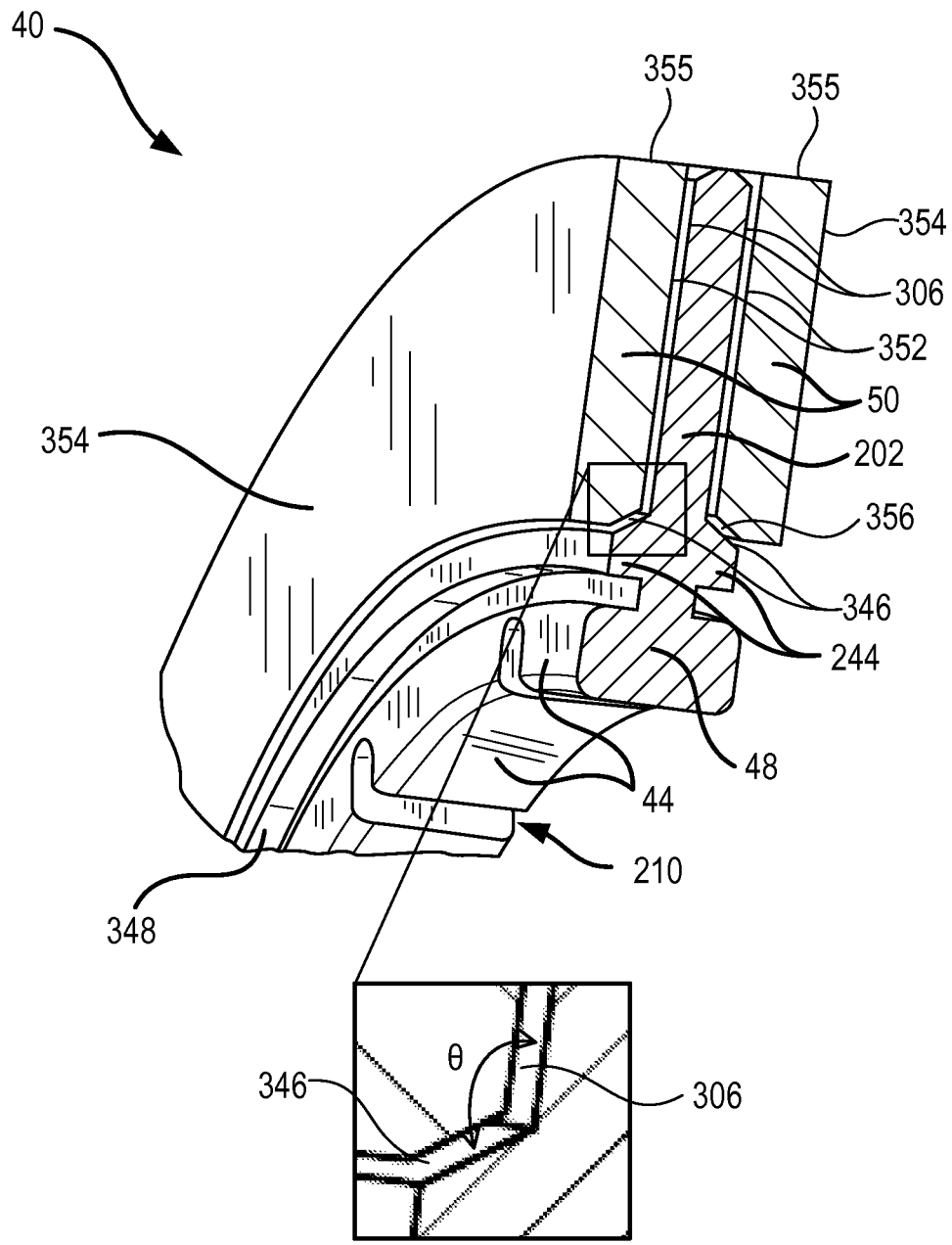
FIG. 3 illustrates, in accordance with various embodiments, a cutaway view of a stator having a floating wear liner.

Referring to FIG. 3, a cutaway view of stator 40 is illustrated according to various embodiments. Stator 40 may comprise stator core 48, stator lugs 44, stator gaps 210, floating stator wear liners 50, and stator retention ring 244. Stator core 48 may have stator retention rings 244 on both axial sides of the stator core. A stator retention ring 244 may be integral to stator core 48, or a stator retention ring may be a separate component coupled to stator core 48. Stator retention rings 244 may project axially from stator core 48 relative to a plane defined by stator contact surface 306. Described differently, each stator contact surface 306 comprises a contact surface that defines a contact surface plane. In various embodiments, stator retention ring 244 may comprise a cross section defined in part by a radially outer wall 346 with an orientation that is not substantially parallel to the axis of stator core 48, and instead is angled relative to the axis of stator core 48 (i.e., an angled outer wall). In various embodiments, outer wall 346 may comprise a plurality of wall segments with different orientations, and may include a wall segment that is substantially parallel to the axis of stator core 48 in addition to an angled retention ring wall segment. The angled retention ring wall segment may define a centration surface, described in greater detail below. A radially inner wall 348 of stator retention ring 244 may define the stator retention ring as a feature of inner core 204 distinct from stator lugs 44. However, other stator retention ring cross-sectional profiles are possible and a stator retention ring and stator lugs need not comprise distinct structural features of inner core 204. For example, in various embodiments, stator lugs 44 and stator retention ring 244 may be integral, with inner core 204 comprising a lug portion defined at an outer radial edge by outer wall 346.

In various embodiments, each retention ring 244 of a stator may have an identical or substantially similar configuration. For example, stator core 48 may be bilaterally symmetrical in a transverse cross-section, as illustrated, with stator retention rings 244 having substantially similar cross sections and stator retention ring outer diameters. This may enable interchangeable use of floating stator wear liners 50 on either side of stator core 48.

Outer wall 346 may define a centration surface of stator retention ring 244. In various embodiments, the centration surface defined by outer wall 346 may have a substantially frustoconical profile, with the radial diameter of outer wall 346 of stator retention ring 244 decreasing from a maximum radius at the base of outer wall 346 where outer wall 346 intersects stator contact surface 306 to a minimum radius at a maximum first angled outer wall axial distance from contact surface 306 (i.e., the point of maximum axial distance of outer wall 346 from stator contact surface 306). The intersection between outer wall 346 and stator contact surface 306 may define an obtuse angle $\theta$. In various embodiments, the angle $\theta$ between outer wall 346 and stator contact surface 306 may be between about 120 degrees and about 150 degrees. In various embodiments, the frustoconical profile of the centration surface of outer wall 346 may serve to bias a floating stator wear liner 50 having a complementary surface toward a position concentric with stator core 48.

In various embodiments, floating stator wear liner 50 may comprise an annular ring configured to contact stator core 48. Each floating stator wear liner 50 may have a first primary wear surface 352 and a second primary wear surface 354 opposite the first primary wear surface. First primary wear surface 352 may be configured to contact stator contact surface 306. Second primary wear surface 354 may be configured to contact an adjacent friction component of a multi-disk brake system, such as rotor 42. In various embodiments, floating stator wear liners 50 may comprise a substantially uniform thickness in an axial dimension. Each floating stator wear liner 50 may further comprise walls extending between primary wear surfaces 352 and 354. An exterior wall 355 defines an outside diameter and an interior wall 356 defines a secondary wear surface. The interior wall 356 that defines the secondary wear surface may have a profile and dimensions complementary to the profile and dimensions of outer wall 346 and be configured to receive outer wall 346 of stator retention ring 244, thereby permitting floating stator wear liner 50 to be fitted about outer wall 346. When fitted about outer wall 346, first primary wear surface 352 may be in contact with stator contact surface 306, and the secondary wear surface defined by interior wall 356 may be in contact with the centration surface of outer wall 346.

As illustrated, floating stator wear liners 50 may be located adjacent to opposite sides of spine 202. In various embodiments, floating stator wear liners 50 may not be coupled to stator core 48, for example, by bonding or by mechanical fastening such as riveting. Rather, in various embodiments, floating stator wear liners 50 may be free to move rotationally and/or axially while adjacent to spine 202 of stator core 48, and may be brought into contact with spine 202 by actuation of the brake system. Floating stator wear liners 50 may be radially constrained by retention ring 244 as described above. Floating stator wear liners 50 may be axially constrained in proximity to spine 202 by adjacent components such as floating rotor wear liners 60 when the brake system is in a running clearance position. Axial constraint of a floating wear liner may be achieved by virtue of the axial distance that retention ring 244 extends from the plane defined by stator contact surface 306 being equal to or greater than the running clearance position distance of the brake system. For example, if the running clearance position distance of a brake system is 0.120 inches (3.048 mm), the axial distance that retention rings 244 extend from the plane defined by stator contact surfaces 306 would need to be at least 0.120 inches (3.048 mm) to maintain axial constraint of floating stator wear liners 50 with the brake system in a running clearance position.

In the illustrated embodiment, both wear liners of stator 40 are floating stator wear liners 50 and are not coupled to stator core 48; however, in various other embodiments, one or more of the wear liners in a stator may not be a floating stator wear liner 50 and instead may be coupled to a contact surface of spine 202. In various embodiments, floating stator wear liners 50 may be replaceable, such that after floating stator wear liners 50 have been worn below a suitable operational thickness, floating stator wear liners 50 may be removed from stator 40 and replaced by new or remanufactured wear liners. Use of floating stator wear liners 50 may provide various advantages during brake system maintenance. For example, floating stator wear liners 50 may be removed and replaced without a need to remove and resurface or machine stator core 48 for continued operation after wear liner replacement.

During aircraft braking, a torque may be applied to floating stator wear liners 50. For example, and with reference now also to FIG. 1, a torque may be applied by an adjacent rotatable brake system component, such as rotor 42 with a rotor core 49, during braking of a moving aircraft. The torque may cause a shear force that, in the absence of a counteracting force, acts to rotate floating stator wear liners 50 relative to stator core 48. Contact between stator contact surface 306 and first primary wear surface 352 may counteract an applied torque. Contact between the centration surface of outer wall 346 and the secondary wear surface defined by interior wall 356 may also contribute to counteracting the applied torque. Because each floating stator wear liner 50 may rotate with respect to outer wall 346 and stator core 48, a frictional force may be produced between stator contact surface 306 and first primary wear surface 352 and between outer wall 346 and interior wall 356 in response to an applied torque with rotation of floating stator wear liner 50 and contact between stator contact surface 306 and first primary wear surface 352 and between outer wall 346 and interior wall 356. The frictional resistance to rotation produced by contact between these surfaces may also limit rotation of each floating stator wear liner 50 relative to rotation of an adjacent rotor 42, and may thereby produce a frictional force between second primary wear surface 354 and the adjacent rotor 42.

Rotation of floating stator wear liner 50 relative to stator core 48 and an adjacent rotor 42 during aircraft braking distributes friction between two primary wear surfaces of floating stator wear liner 50, rather than a single surface of a fixed stator wear liner. This results in a reduced relative rotational velocity at each friction interface of floating stator wear liner 50 compared to the single friction interface of a fixed wear liner. Distribution of frictional forces amongst a higher number of friction interfaces may also improve heat distribution to the heat sink of the brake system. The increased number of friction interfaces and improved heat distribution may permit use of braking systems with a decreased number of rotors and stators. Likewise, the increased distribution of frictional forces and improved heat distribution may improve wear rates of wear liners. Rotation of floating stator wear liner 50 may also produce a vibration damping benefit due to reduced torque oscillations that might be induced by a sudden high friction event that may occur at a friction interface in a multi-disk brake system during aircraft braking. For example, a sudden high friction event occurring at a friction interface between a rotor wear liner and a floating stator wear liner may result in rotation of the floating stator wear liner with respect to the stator core, rather than causing the torque force to accumulate in the braking system in response to the high friction event and overcome the high friction even in a sudden manner, producing a torque oscillation that may lead to a vibration transmitted through the braking system.

Wear of primary wear surface 352 may produce material removal of a uniform thickness of floating stator wear liner 50 in an axial dimension. Removal of a uniform thickness of material from primary wear surface 352 due to frictional wear may produce an increased contact pressure between the secondary wear surface defined by interior wall 356 and the centration surface of outer wall 346 during brake system actuation and axial compression. The increased contact pressure between these surfaces may bias floating stator wear liner 50 toward a concentric position relative to stator core 48. Thus, the frustoconical configuration of the centration surface of outer wall 346 may radially constrain floating stator wear liner 50 and provide for centration of floating stator wear liner 50 to a substantially concentric position over the course of progressive frictional wear of floating stator wear liner 50 during its service life.

Figure 4:
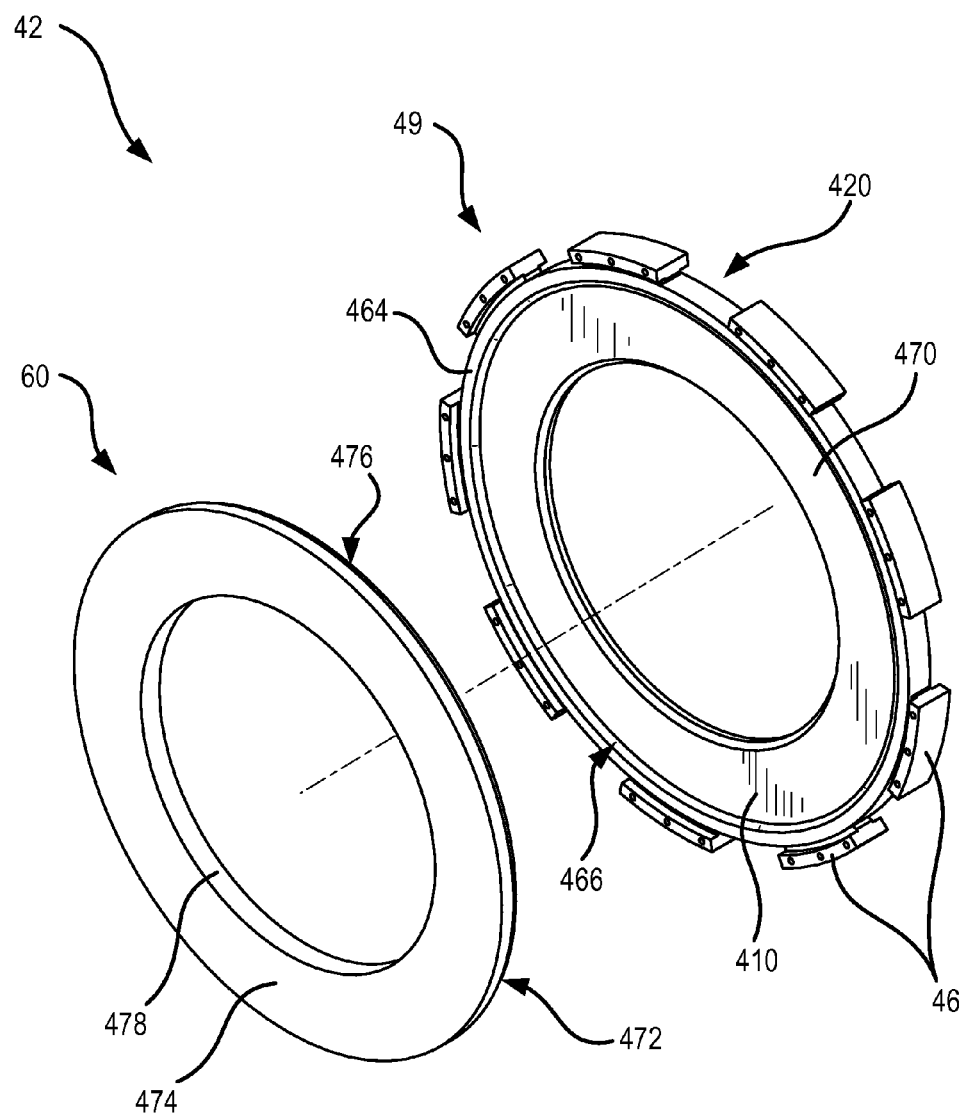
FIG. 4 illustrates, in accordance with various embodiments, an exploded view of a rotor having a floating wear liner.

Referring to FIG. 4, an exploded view of a rotor 42 is illustrated according to various embodiments. Rotor 42 may comprise rotor core 49 and rotor wear liners 60 (one shown). Similar to stators 40 described above, rotor core 49 and floating rotor wear liners 60 of rotor 42 may comprise different materials. For example, in various embodiments, rotor core 49 may comprise a first material such as steel, and floating rotor wear liners 60 may comprise a second material such as carbon composite material. However, in various embodiments, rotor core 49 and rotor wear liners 60 may comprise the same material, such as a carbon composite material. In various embodiments, the material of rotor core 49 may be selected for its structural properties, thermal conductivity, heat capacity, and/or oxidation resistance properties. For example, rotor core 49 may comprise silicon carbide or titanium. A material of floating rotor wear liners 60 may be selected for its frictional properties. For example, floating rotor wear liners 60 may comprise a carbon composite material. Thus, rotor 42 may contain the structural advantages of rotor core 49, and the frictional advantages of floating rotor wear liners 60.

Rotor core 49 may comprise rotor spine 410 and rotor lugs 46. Rotor core 49 may engage rotor splines 18 in rotor gaps 420 formed between rotor lugs 46. Thus, rotor 42 may be rotatable by virtue of the engagement between rotor lugs 46 of rotor core 49 and rotor splines 18 of wheel 10. Rotor core 49 may comprise rotor retention ring 464 located radially inward from the rotor lugs 46. In various embodiments, rotor retention ring 464 may comprise an annular feature that may be substantially concentric with rotor core 49 and may extend axially from the rotor core 49 relative to a plane defined by contact surface 470 (only one surface visible) of the rotor core. Described differently, each rotor contact surface 470 comprises a contact surface that defines a contact surface plane. In various embodiments, rotor retention ring 464 may comprise a cross section defined in part by a radially inner wall 466 with an orientation that is not substantially parallel to the axis of rotor core 49, and instead is angled (i.e., an angled inner wall) relative to the axis of rotor core 49. In various embodiments, inner wall 466 may comprise a plurality of wall segments with different orientations, and may include a wall segment that is substantially parallel to the axis of rotor core 49 in addition to an angled retention ring wall segment. The angled retention ring wall segment may define a centration surface similar to that described above for stator core 48. Rotor retention ring 464 may be integral to rotor core 49, as shown, or a rotor retention ring may be a separate component coupled to rotor core 49. A radially outer wall of rotor retention ring 464 may define the rotor retention ring as a feature of rotor core 49 distinct from rotor lugs 46. However, other rotor retention ring cross-sectional profiles are possible and a rotor retention ring and rotor lugs may not comprise distinct structural features of rotor core 49. In various embodiments, each rotor retention ring 464 may have a substantially similar configuration in a manner similar to that described above with respect to stator retention rings 244, thereby enabling interchangeable use of floating rotor wear liners 60 on either side of rotor core 49.

Figure 8:
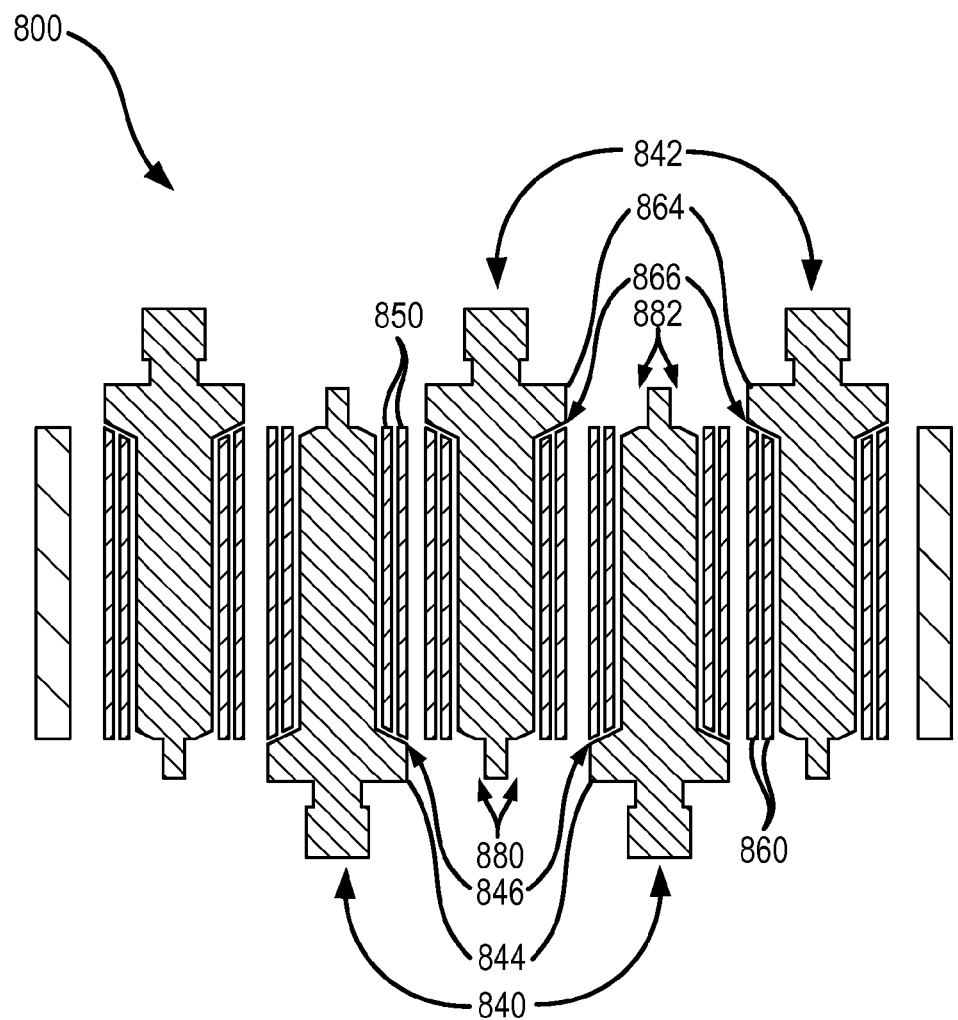
FIG. 8 illustrates, in accordance with various embodiments, a multi-disk brake system with rotors and stators having multiple floating wear liners.

Inner wall 466 may define a centration surface of rotor retention ring 464. In various embodiments, the centration surface defined by inner wall 466 may have a substantially frustoconical profile (i.e., an inverted frustoconical profile), with the radius of inner wall 466 increasing from a minimum radius at the base of inner wall 466 where inner wall 466 intersects rotor contact surface 470 to a maximum radius at an angled inner wall axial distance from rotor contact surface 470. With reference also to FIG. 8, the substantially frustoconical profile of the centration surface defined by inner wall 466 is more clearly illustrated by the profiles of inner walls 866 shown in a cross-sectional view of rotors 842. The intersection between inner wall 466 and rotor contact surface 470 may define an obtuse angle similar to angle θ described with reference to FIG. 3. In various embodiments, the angle between inner wall 466 and rotor contact surface 470 may be between about 120 degrees and about 150 degrees. In various embodiments, the frustoconical profile of the centration surface of inner wall 466 may serve to bias a floating rotor wear liner 60 having a complementary surface toward a position concentric with stator core 48.

In various embodiments, floating rotor wear liner 60 may comprise an annular ring configured to contact rotor core 49. Each floating rotor wear liner 60 may have a first primary wear surface 472 and a second primary wear surface 474 opposite the first wear surface. First primary wear surface 472 may be configured to contact rotor contact surface 470. Second primary wear surface 474 may be configured to contact an adjacent friction component of a multi-disk brake system, such as stator 40. In various embodiments, floating rotor wear liners 60 may comprise a substantially uniform thickness in an axial dimension. Each floating rotor wear liner 60 may further comprise axial walls extending between primary wear surfaces 472 and 474, with an exterior axial wall 476 that defines a secondary wear surface and an interior axial wall 478 that defines an interior diameter. Exterior axial wall 476 defining the outside secondary wear surface may have a profile complementary to the profile of inner wall 466 and be configured to be received by inner wall 466 of rotor retention ring 464. Thus, floating rotor wear liner 60 may be fit within inner wall 466 and located adjacent to rotor core 49, with first primary wear surface 472 in contact with rotor contact surface 470, and the secondary wear surface defined by exterior axial wall 476 in contact with the centration surface of inner wall 466.

Figure 5:
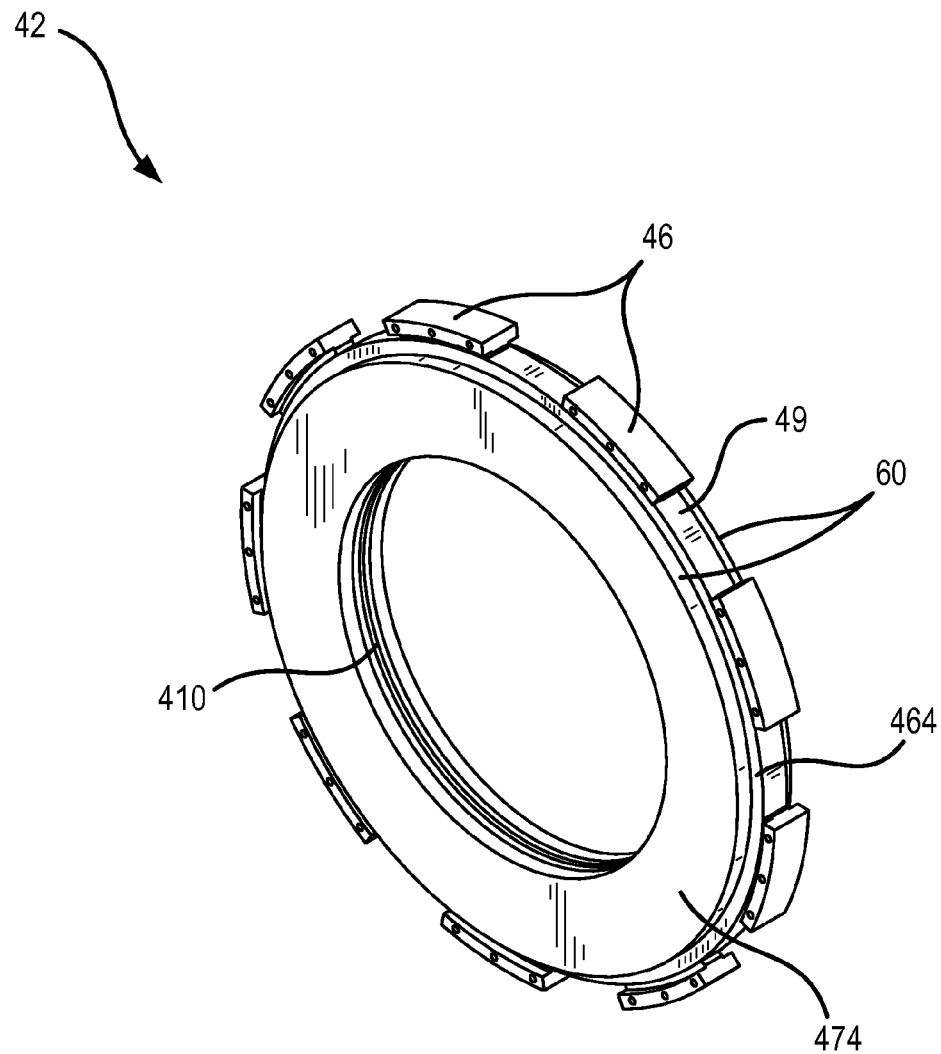
FIG. 5 illustrates, in accordance with various embodiments, a perspective view of an assembled rotor having a floating wear liner.

Referring to now to FIG. 5, an assembled rotor 42 is illustrated according to various embodiments. Rotor 42 comprises floating rotor wear liners 60 located adjacent to each side of rotor spine 410 of rotor core 49. With reference also to FIG. 4, floating rotor wear liner 60 may be fit within inner wall 466 of rotor retention ring 464. Floating rotor wear liners 60 may not be coupled to rotor core 49, for example, by bonding or by mechanical fastening. In various embodiments, floating rotor wear liners 60 may be free to move rotationally and/or axially while adjacent to spine 410 of rotor core 49, and may be brought into contact with spine 410 by actuation of the braking system. However, in various embodiments, one or more of the wear liners in a rotor of a multi-disk braking system may not be a floating rotor wear liner 60 and instead may be coupled to a surface of spine 410.

Similar to stator 40, the configurations of floating rotor wear liner 60 and rotor core 49 may permit floating rotor wear liner 60 to rotate within inner wall 466 during operation of the brake system while reducing or minimizing radial movement and radially constraining floating rotor wear liner 60 in a suitable position to contribute to braking performance when the brake system is actuated. Similar to stator 40, floating rotor wear liners 60 may move axially and rotationally in an assembled brake system. Floating rotor wear liners 60 may be axially constrained by adjacent components such as stators 40 when the brake system is in a running clearance position by virtue of the axial distance that rotor retention ring 464 extends from the plane defined by rotor contact surface 470 being equal to or greater than the running clearance position distance of the brake system.

In various embodiments, first primary wear surface 472 of floating rotor wear liner 60 located opposite rotor wear surface 470 of rotor core 49 may contact rotor wear surface 470 during braking. Likewise, the secondary wear surface defined by exterior axial wall 476 may contact inner wall 466. A torque applied to rotor core 49 and contact with floating rotor wear liner 60 described above may cause a shear force that, in the absence of a counteracting force, acts to rotate floating rotor wear liner 60. Rotation of floating wear liner 60 may be counteracted by contact (indirect or direct contact) with a non-rotatable brake system component such as stator 40, as described above. For example, floating rotor wear liner 60 may contact floating stator wear liner 50, which may exert a counteracting force by virtue of contact with (i.e., a static frictional force) stator core 48. The counteracting static frictional force may produce a dynamic frictional force between second primary wear surface 474 of floating rotor wear liner 60 and wear surface 354 of floating stator wear liner 50. The frictional resistance to rotation of floating rotor wear liner 60 produced by floating stator wear liner 50 may limit rotation of floating rotor wear liner 60 relative to rotor core 49, thereby producing a dynamic frictional force between first primary wear surface 472 and contact surface 470. In this manner, rotation of floating rotor wear liner 60 relative to rotor core 49 and an adjacent stator 40 during aircraft braking distributes friction between two primary wear surfaces of floating rotor wear liner 60, rather than a single surface of a fixed stator wear liner. Frictional resistance may also be produced between the centration surface of inner wall 466 and the secondary wear surface defined by exterior axial wall 476.

Various benefits of rotation of floating stator wear liners 50 relative to stator cores 48 described above may similarly apply to rotation of floating rotor wear liners 60. Likewise, wear of first primary wear surface 472 may produce similar centration effects by virtue of the frustoconical configuration of the centration surface defined by inner wall 466 of stator retention ring 464.

Figure 6:
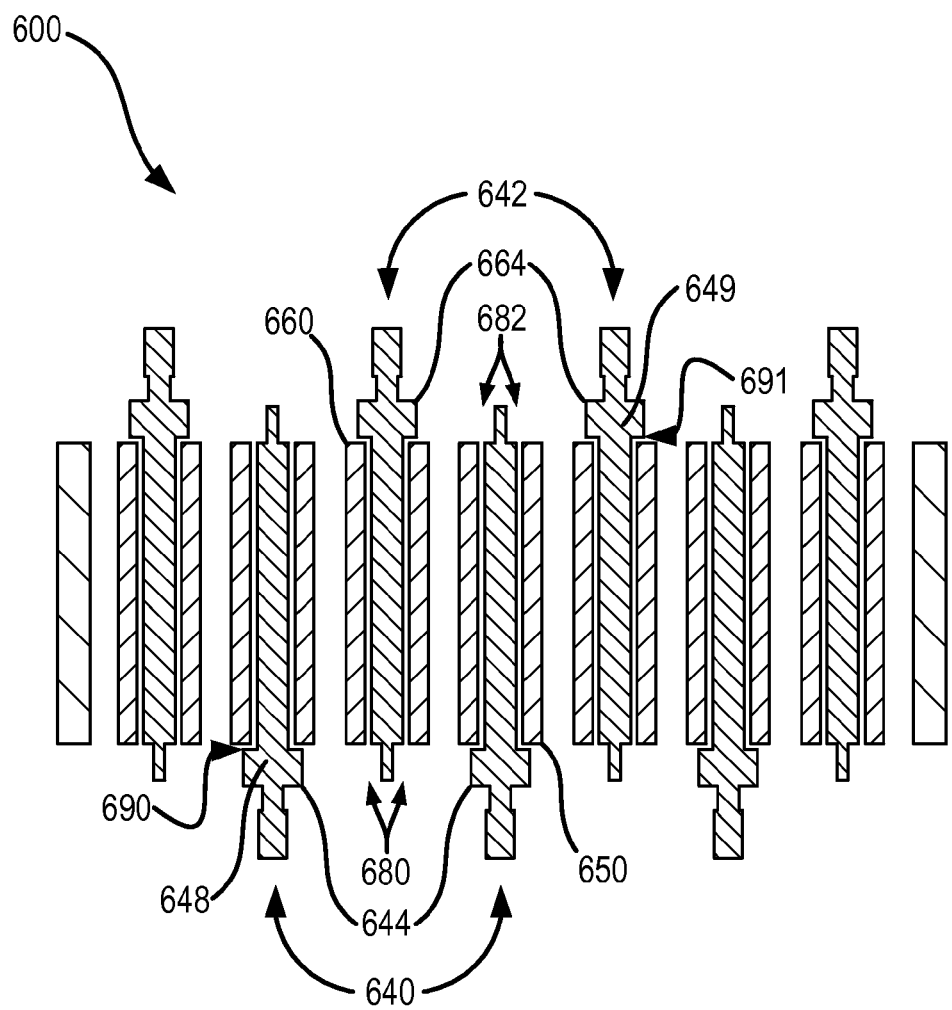
FIG. 6 illustrates, in accordance with various embodiments, rotors and stators with floating wear liners in a multi-disk brake system.

With reference to FIG. 6, a diagram of a multi-disk brake system 600 is shown. Multi-disk brake system 600 may comprise a plurality of stators 640 and a plurality of rotors 642, which together form a plurality of adjacent stator-rotor pairs. In various embodiments, each stator 640 may comprise at least one floating stator wear liner 650, a stator core 648, a stator retention ring 644, and a rotor retention ring slot 682. Rotor retention ring slot 682 may be disposed in stator core 648 and may be configured to receive rotor retention ring 664, and floating stator wear liner 650 may be radially constrained in multi-disk brake system 600 by stator retention ring 644. Similarly, each rotor 642 may comprise at least one floating rotor wear liner 660, a rotor core 649, a rotor retention ring 664, and a stator retention ring slot 680. Each stator retention ring slot 680 may be disposed in rotor core 649 and may be configured to receive a stator retention ring 644. Floating rotor wear liner 660 may be radially constrained by rotor retention ring 664. In various embodiments, floating stator wear liner 650 and floating rotor wear liner 660 may be disposed between stator core 648 and rotor core 649. Thus, an adjacent stator-rotor pair may comprise a plurality of floating wear liners disposed between the stator core and the rotor core of the stator-rotor pair. Floating stator wear liner 650 and floating rotor wear liner 660 may be allowed to rotate relative to one another, for example, while in contact with one another (i.e., the floating wear liners may be in rotatable contact with each other) during actuation of the braking system.

In various embodiments, stator retention rings 644 and rotor retention rings 664 may have substantially rectangular cross sections with axial retention ring walls such as axial stator retention ring wall 690 and axial rotor retention ring wall 691, and stator retention ring slots 680 and rotor retention ring slots 682 may have complementary cross sections to axial stator retention ring wall 690 and axial rotor retention ring wall 691, respectively. In various embodiments, other retention ring cross sections and complementary retention ring slot cross sections, such as cross sections with angled walls disclosed elsewhere herein, are possible.

A complementary retention ring and retention ring slot configuration may permit stator core 648 and rotor core 649 to come into close proximity over the service life of floating wear liners 650 and 660, with substantially complete sacrificial wear of the floating wear liners occurring prior to contact between the retention rings and retention ring slots and/or primary contact surfaces of adjacent stator and rotor cores. In addition, use of two floating wear liners between the stator core and the rotor core in an adjacent stator-rotor pair provides three primary frictional interfaces between the stator core and the rotor core of the adjacent stator-rotor pair, rather than the single frictional interface provided when fixed wear liners are used.

Figure 7:
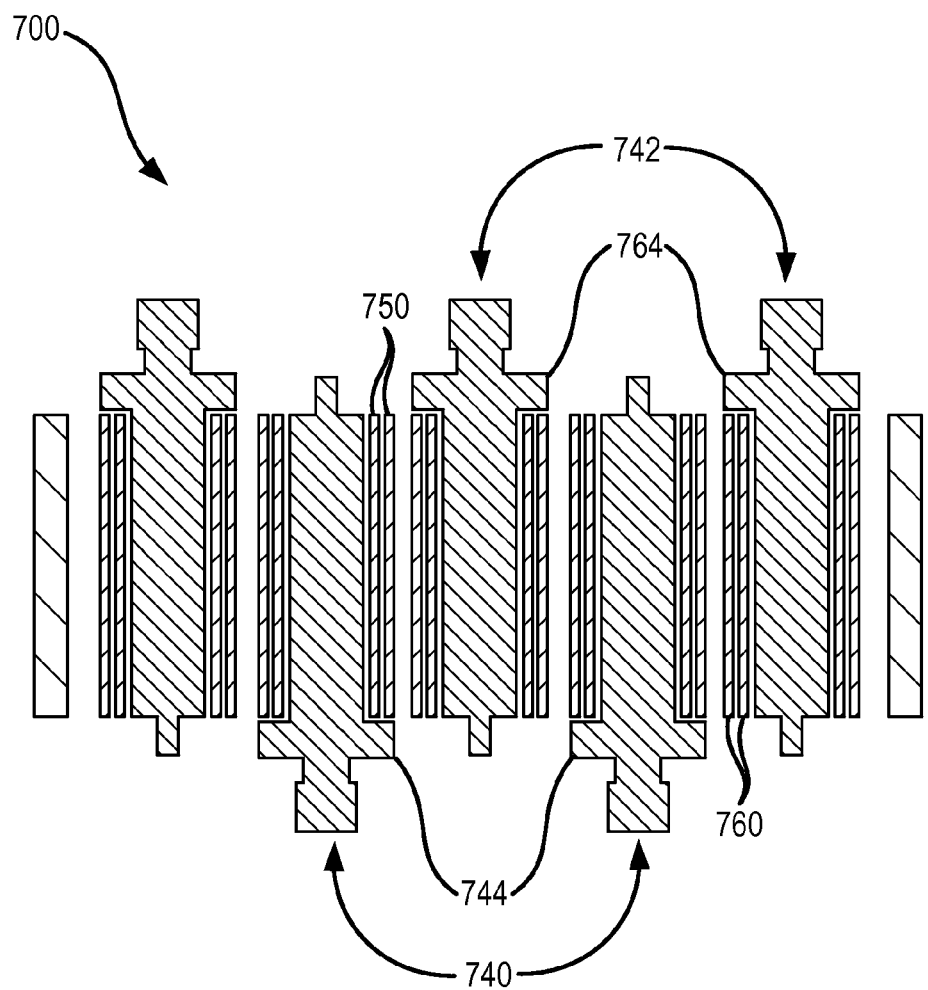
FIG. 7 illustrates, in accordance with various embodiments, a multi-disk brake system with rotors and stators having multiple floating wear liners.

Referring now to FIGS. 7 and 8, diagrams of multi-disk brake systems 700 and 800 are shown. Multi-disk brake system 700 comprises a plurality of stators 740 and a plurality of rotors 742, which together form a plurality of rotor-stator pairs. Stators 740 and rotors 742 may comprise the various attributes described above with respect to stators 640 and rotors 642. Additionally, each stator retention ring 744 may be configured to radially constrain a plurality of floating stator wear liners 750 and each rotor retention ring 764 may be configured to radially constrain a plurality of floating rotor wear liners 760. Multi-disk brake system 800 is similarly configured with a plurality of stators 840 and a plurality of rotors 842 together forming a plurality of rotor-stator pairs. Stators 840 and rotors 842 may comprise various attributes described above with respect to stators 740 and rotors 742. Stators 840 and rotors 842 may also comprise stator retention rings 844 and rotor retention rings 864 with angled retention ring walls 846 and 866 and complementary retention rings slots 880 and 882. Each stator retention ring 844 may be configured to radially constrain and provide for centration of a plurality of floating stator wear liners 850. Likewise, each rotor retention ring 864 may be configured to radially constrain and provide for centration of a plurality of floating rotor wear liners 860. The increased number of floating wear liners associated with each retention ring of a stator or a rotor in multi-disk brake systems 700 and 800 increases the number of frictional interfaces and the amount of frictional force that may be generated within the multi-disk brake system per stator-rotor pair. The increased number of frictional interfaces may minimize issues related to dynamic thermal flux within the multi-disk brake system and promote more even distribution of thermal energy created by frictional forces under aircraft braking. These advantages may permit a decreased number of rotor cores and stator cores in a multi-disk brake system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
   a friction disk core comprising:
      a spine comprising a first contact surface of the spine that defines a first contact surface plane; and
      a first retention ring comprising an annular feature, the first retention ring disposed substantially concentrically with the friction disk core and extending axially relative to the first contact surface plane,
      wherein the first retention ring comprises an angled first retention ring wall that defines a first centration surface, and
      wherein the angled first retention ring wall is not substantially parallel to a friction disk core axis; and
   a first floating wear liner comprising:
      a first primary wear surface configured to contact the first contact surface;
      a second primary wear surface opposite the first wear surface;
      an interior wall;
      and an exterior wall;
      wherein the interior wall and the exterior wall extend between the first wear primary surface and the second primary wear surface, and wherein one of the interior wall and the exterior wall is configured to contact the first centration surface the first floating wear liner is allowed to rotate with respect to the friction disk core.

2. The friction disk of claim 1, wherein the first centration surface has a substantially frustoconical profile.

3. The friction disk of claim 2, wherein an angle defined by an intersection of the first contact surface plane and the angled first retention ring wall is between about 120 degrees and about 150 degrees.

4. The friction disk of claim 3, wherein removal of a uniform thickness of material from the first primary wear surface produces an increased contact pressure between the first centration surface and at least one of the interior wall or the exterior wall is configured to contact the first centration surface.

5. The friction disk of claim 4, wherein the first floating wear liner is biased to a concentric position relative to the friction disk core in response to the increased contact pressure.

6. The friction disk of claim 1, wherein the friction disk is a stator, wherein the first retention ring is a stator retention ring, wherein the first retention ring wall is an angled outer wall of the stator retention ring, and wherein the interior wall of the first floating wear liner is configured to receive the angled outer wall of the stator retention ring.

7. The friction disk of claim 1, wherein the friction disk is a rotor, wherein the first retention ring is a rotor retention ring, wherein the first retention ring wall is an angled inner wall of the rotor retention ring, and wherein the angled inner wall of the rotor retention ring is configured to receive the exterior wall of the first floating wear liner.

8. The friction disk of claim 1, further comprising:
   a second floating wear liner, and
   wherein the friction disk core further comprises:
      a second contact surface of the spine that defines a second contact surface plane; and
      a second retention ring comprising an annular feature, the second retention ring disposed substantially concentrically with the friction disk core and extending axially relative the second contact surface plane,
   wherein the second retention ring has an angled second retention ring wall that defines a second centration surface, and
   wherein the angled second retention ring wall is not substantially parallel to the friction disk core axis.

9. A multi-disk brake system comprising:
   a plurality of adjacent stator-rotor pairs, each one of the adjacent stator-rotor pairs comprising a stator core and a rotor core; and
   a plurality of floating wear liners, wherein the plurality of floating wear liners comprises a first floating wear liner and a second floating wear liner disposed between the stator core and the rotor core in at least one of the plurality of adjacent stator-rotor pairs;

wherein at least one of the stator cores and the rotor cores comprises a retention ring;

wherein each of the plurality of floating wear liners is radially constrained within the multi-disk brake system by the retention ring located on the at least one of the of stator cores and the rotor cores; and wherein the first floating wear liner and the second floating wear liner are in rotatable contact with each other.

10. The multi-disk brake system of claim 9, further comprising:

a stator retention ring; and a rotor retention ring;

wherein the stator core comprises a rotor retention ring slot configured to receive the rotor retention ring, and wherein the rotor core comprises a stator retention ring slot is configured to receive the stator retention ring.

11. The multi-disk brake system of claim 10, wherein the stator retention ring and the rotor retention ring each comprise one of an angled retention ring wall and an axial retention ring wall.

12. The multi-disk brake system of claim 11, wherein the stator retention ring and the rotor retention ring are each configured to radially constrain at least two of the plurality of floating wear liners.

13. The multi-disk brake system of claim 11, wherein the multi-disk brake system comprises at least three primary frictional interfaces between the stator core and the rotor core of an adjacent stator-rotor pair.

14. The multi-disk brake system of claim 12, wherein the stator retention ring and the rotor retention ring each comprise the angled retention ring wall, and wherein the angled retention ring wall is configured to provide for centration of the at least two of the plurality of floating wear liners.

* * * * *